Jan. 13, 1942.  R. B. McKINNIS  2,270,007
APPARATUS FOR EXTRACTING FRUIT AND VEGETABLE JUICES
Filed Jan. 22, 1940  2 Sheets-Sheet 1
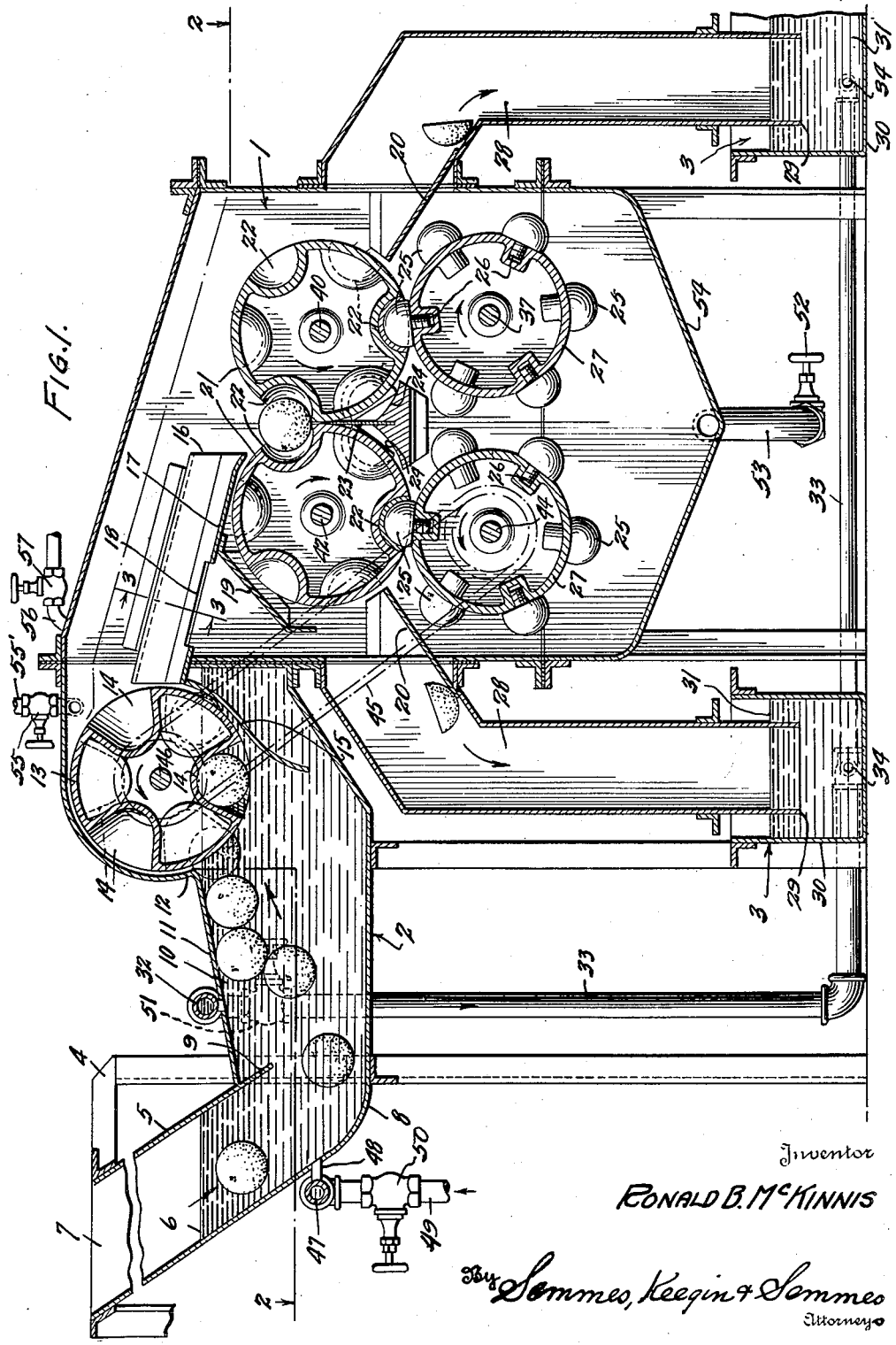
Inventor
RONALD B. McKINNIS
By Sommes, Keegin & Sommes
Attorneys

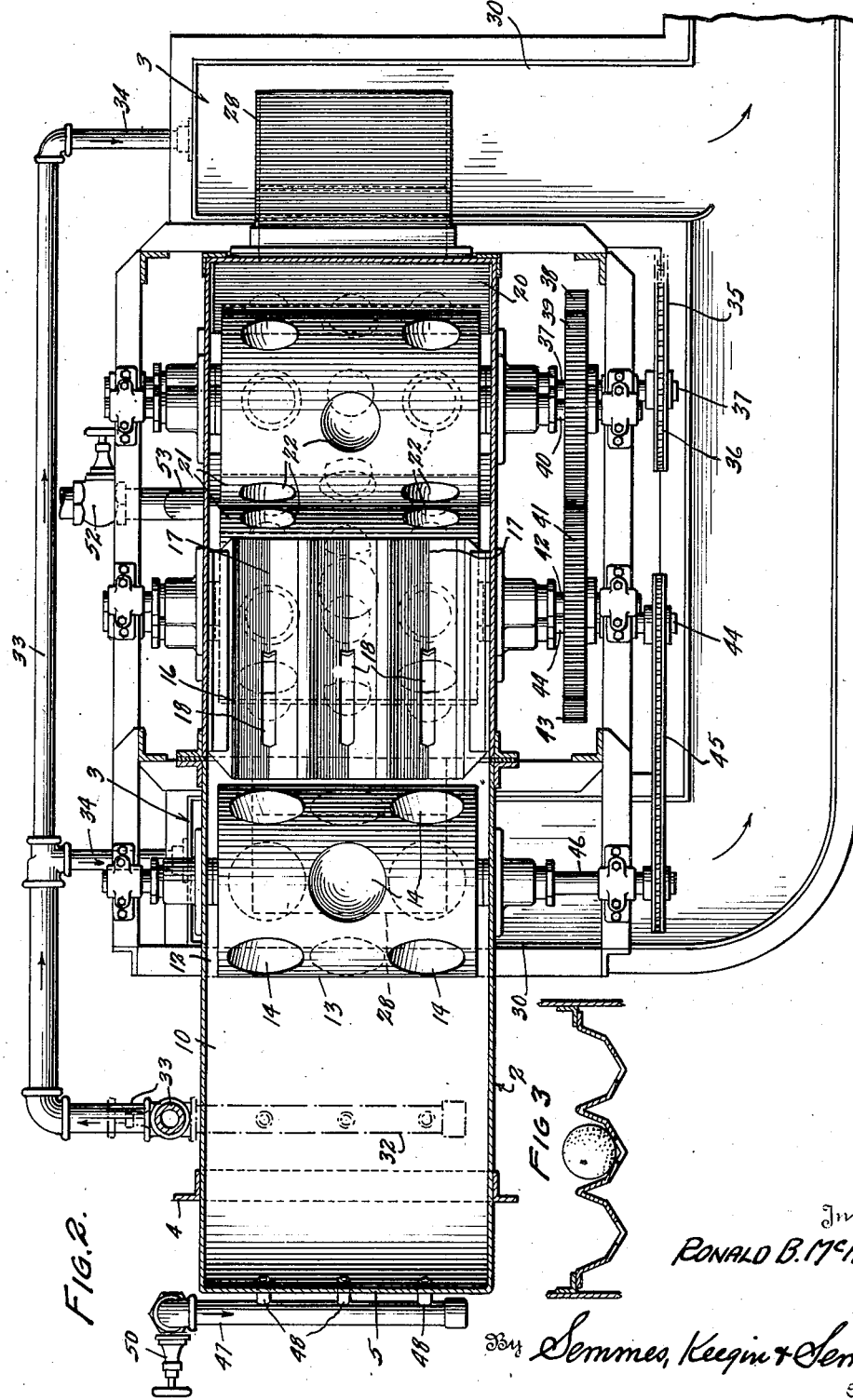

Patented Jan. 13, 1942

2,270,007

UNITED STATES PATENT OFFICE 2,270,007

APPARATUS FOR EXTRACTING FRUIT AND VEGETABLE JUICES

Ronald B. McKinnis, Winter Haven, Fla., assignor to Sunshine Foods, Inc., Winter Haven, Fla., a corporation of Florida Application January 22, 1940, Serial No. 315,118

15 Claims. (Cl. 99—239)

My invention relates to a process and apparatus for extracting juice from fruits and vegetables.

In extracting the juice from fruits and vegetables my desire is to prevent oxidation of the juice by atmospheric oxygen. In order to accomplish this I perform the extracting operation in a non-oxidizing atmosphere in an extracting chamber. The fruit is passed into the extracting chamber through a seal to prevent access of oxygen. Waste from the extracting chamber, such as hulls of the fruit or vegetables, is passed through an outlet seal likewise to prevent access of atmospheric oxygen to the extracting chamber. Ordinarily I employ liquid seals for both the input and for the output. In order to deliver fruit or vegetables from the input seal, I have heretofore employed a mechanical conveying mechanism. In the present invention instead of a conveyor I employ a moving stream of water in the input seal which carries the starting material, such as oranges, through the seal. Means may be provided for lifting the oranges from the seal into the extracting chamber.

The overflow from the input seal can be employed to move the waste material from the output seal. Excess water is drained from the surface of the fruit through the operation of a specially constructed feeding chute.

An object of my invention is to provide a process and apparatus which will eliminate the necessity for expensive conveyor mechanism in the input seal to the extracting apparatus.

Another object of the invention is to provide a process and apparatus which will utilize the overflow from the moving stream of water in the input seal to help move the waste material from the output seal.

Another object of the invention is to provide a new form of feeding chute for the fruit or vegetables extracted.

Yet another object of the invention is to pro-provide a form of lifting mechanism to remove the fruit or vegetables from the input seal for delivery to the extracting chamber.

Other objects will be apparent from the ensuing description.

In the drawings:

Figure 1 is a transverse sectional view taken through one form of my apparatus;

Fig. 2 is a view taken along the line 2—2 of Fig. 1, looking in the direction of the arrows;

Fig. 3 is a detail sectional view taken along the line 3—3 of Fig. 1, looking in the direction of the arrows, and showing the construction of the feeding trough.

Referring to the drawings, I have shown a juice extracting chamber 1 in which the juice of fruit or vegetables is extracted in a non-oxidizing atmosphere. Preferably I employ an inert gas in the extracting chamber 1, such as carbon dioxide, nitrogen, a combination of the two, or other inert gases. In order to prevent contamination of the atmosphere in the extracting chamber 1 with atmospheric oxygen, I have shown a liquid input seal 2 and liquid output seals 3.

The liquid input seal is adapted to receive a fruit or vegetable from which the juice is to be extracted. In the present instance for the purpose of illustration, I have shown oranges which are in the process of being extracted. On a support 4 is mounted an input tube 5 which is inclined, and in which there is adapted to exist a water level, as indicated at 6. Oranges are dropped into the mouth 7 of this tube 5 and pass down adjacent the bottom 8 of a mid portion of the input seal. There is provided a baffle 9 at the end of the section 5 under which the oranges must pass. The oranges then float upwardly in the middle portion 10 of the input seal and contact an upwardly inclined wall 11 at the top, from which the oranges roll forward, as indicated by the arrow, into a section 12 of the seal 2, from which the oranges are adapted to be raised and passed to the extracting chamber 1.

In the section 12 of the input seal is a rotating feeding element 13 having three series of circumferentially aligned feeding apertures 14 formed in the surface thereof which are adapted to pass the oranges as indicated in Fig. 1. Upon rotation of the element 13 in a direction indicated by the arrow, the oranges are passed upwardly, sliding along a baffle 15, and are delivered into a feeding chute 16. The feeding chute 16 (see Fig. 3) is provided with three runways 17 corresponding to the three sets of apertures 14. The oranges pass down the runways 17, which are V-shaped in cross sectional configuration to center the oranges, and roll over an aperture 18 formed in each of the troughs 17. This permits the excess water to drain from the surface of the oranges. The water is discharged through the apertures 18 onto a plate 19 and flows thence onto guide plates 20 which are adapted to receive the hulls of the oranges which have been extracted.

The details of the extracting mechanism for the oranges is not shown in detail, as this construction forms no part of the present invention.

It is sufficient for illustrative purposes only to indicate that there are two rollers 21 having three rows of receiving pockets 22 therein which are adapted to receive three rows of oranges delivered from the chute 16. The rollers are adapted to travel in the direction indicated by the arrows and to carry the oranges downwardly over a cutting knife 23 where the oranges are divided into halves. These halves are prevented from falling from the pockets 22 by means of guiding surfaces 24. When the cut halves of the oranges have passed over the lower end of the guiding surfaces 24, they are engaged by extractor members 25 which are screw-threaded into supports 26 formed in rotating drums 27. The juice is pressed from the oranges by means of the extractor members 25 (see Fig. 1).

Upon further rotation of the drums 21 and 27, the hulls are delivered to the downwardly sloping plates 20 from which the hulls are delivered into discharge tubes 28 whose ends 29 lie below the surface of the water in troughs 30. The hulls pass downwardly beyond the lower edge 29 of the tubes 28 and are discharged into the water 31 in the troughs 30. There is a motion of the water 31 which whips the hulls in the direction indicated by the arrows in Fig. 2, to some suitable discharge.

The water in the troughs 30 is given the necessary directional flow, as indicated by the arrows in Fig. 2, by discharge of overflow from the input seal 2 through an overflow pipe 32 mounted on the upwardly inclined wall 11 of the input conveyor 2. This overflow pipe 32 is adapted to have a water level in it corresponding to the water level 6. The overflow pipe 32 discharges through a line 33 and header connections 34 into each of the troughs 30, as indicated by arrows in Fig. 2.

The extractor mechanisms and rotating conveyor element 13 are given the necessary rotation by means of a drive chain 35 which communicates with some suitable source of power, not shown, and which passes over a sprocket wheel 36 and drives a shaft 37 for rotating one of the drums 27. The shaft 37 turns a gear 38 which meshes with a gear 39 mounted on a shaft 40 for turning one of the drums 21. The gear 39 is meshed with a gear wheel 41 mounted on a shaft 42 for driving the other drum 21.

The gear wheel 41 meshes with a gear 43 which drives a shaft 44 for one of the drums 27. Thus the drums 21 and 27 are geared together to turn in a predetermined manner, thus synchronizing the operation of the extracting mechanisms in the extracting chamber 1. This extracting mechanism should also be synchronized with the elevating drum 13 which is adapted to remove the oranges from the water seal 2. This is accomplished by a chain drive 45 which passes over a sprocket on the shaft 44 and over a sprocket on a shaft 46 with which the elevating drum 13 is adapted to rotate.

In order to urge forward the oranges under the baffle 9 formed in the input seal 2, I have provided means for directing the water in a stream under the baffle 9. To accomplish this I have provided a header 47 which directs a plurality of streams of water through nozzles 48. The header 47 communicates with an input water line 49 controlled by a valve 50.

In order to start the apparatus in operation, it is desirable to purge out all atmospheric air from the apparatus. Preferably I flood the apparatus first with water and then withdraw the water, permitting inert gas to enter in place of the water. This can be accomplished by shutting a valve 51 in the line 33 and opening the water inlet valve 50. A valve 52 in a juice outlet line 53 is shut. The juice outlet line enters the lowermost point of a sloped bottom construction 54 of the extracting chamber 1, in which bottom is adapted to collect the extracted juice from the oranges. A vent valve 55 is opened in a vent line 55' at the top of the apparatus. The bottom of discharge tubes 28 can be closed by cover plates (not shown). The apparatus will then fill with water and when it is full the vent line 55' is closed by valve 55 and the valve 50 in the water inlet line 49 is closed. Inert gas is admitted through a line 56 controlled by a valve 57 into the top of the apparatus. Valve 52 is opened in juice line 53 and the cover plates (not shown) are removed from the bottom of the discharge tubes 28. The water is then drawn out of the apparatus and is replaced by inert gas through the inert gas inlet line 56 until the water levels as indicated in Fig. 1 are established. The valve 52 in the juice discharge line 53 is then closed; the valve 51 in the overflow line 33 is opened; and the valve 50 in the water inlet line 49 is opened.

Thus the flow of water through the inlet liquid seal is established, the overflow water passing down into troughs 30 through the discharge line 33 and branch lines 34.

Power is then supplied through drive chain 35 to rotate the drums. Oranges are admitted into the tube 5 and pass, as indicated by the arrows, through the input water seal being elevated by the rotating drum 13, into feed trough 16 through the cutting operation between rollers 21 and the extracting operation through the action of extracting plungers 25 on the rollers 27. The hulls are discharged over plates 20 and flow through discharge plates 29 into the water seals, the hulls being swept out, as indicated by the arrows in Fig. 2, by reason of the flow of water in the troughs 30 generated through the overflow from the input seal passing down through discharge pipe 33 into troughs 30.

When sufficient juice has been collected in the bottom of the extracting chamber 1, control valve 52 is opened and juice is withdrawn through the discharge line 53. The excess water from the oranges is discharged, as previously indicated, through apertures 18 formed in the troughs 17, the water passing over plate 19 and down through one of the discharge tubes 28. If desired a slight excess of inert gas over atmospheric pressure can be maintained in the extracting chamber 1 by admitting inert gas at slightly greater than atmospheric pressure through gas input line 55.

It is to be understood that in the usual practice the non-oxidized juice flowing through discharge line 53 is passed to canning and pasteurization steps, all conducted in such a manner as to prevent oxidation of the juice by atmospheric oxygen.

I desire that my invention be limited only by the scope of the appended claims and the showing of the prior art.

I claim:

1. In an apparatus for extracting juice from vegetables and fruits, an extracting chamber filled with an inert gas, means in said extracting chamber to extract the juice from the fruits or vegetables, a substantially U-shaped liquid seal communicating with the extraction chamber, and means creating a flow of liquid in the seal to carry the fruits or vegetables through the seal.

2. In an apparatus for extracting juice from vegetables and fruits, an extracting chamber having a non-oxidizing atmosphere, means in said extracting chamber to extract the juice from the fruits or vegetables, a liquid input seal communicating with the chamber, a baffle element in the seal, means to create a current of liquid to carry the fruits or vegetables under the baffle, and a liquid output seal leading from the extraction chamber through which waste is passed.

3. In an apparatus for extracting juice from vegetables and fruits, an extracting chamber filled with an inert gas, means in said extracting chamber to extract the juice from the fruits or vegetables, a substantially U-shaped liquid seal communicating with the extraction chamber, means creating a flow of liquid in the seal to carry the fruits or vegetables through the seal, and elevating means to raise the fruits or vegetables from the seal and deliver them to the extraction chamber.

4. In an apparatus for extracting juice from vegetables and fruits, an extracting chamber having a non-oxidizing atmosphere, means in said extracting chamber to extract the juice from the fruits or vegetables, a liquid input seal communicating with the chamber, a baffle element in the seal, means to create a current of liquid to carry the fruits or vegetables under the baffle, elevating means to raise the fruits or vegetables from the seal and deliver them to the extraction chamber, and a liquid output seal leading from the extraction chamber through which waste is passed.

5. In an apparatus for extracting juice from vegetables and fruits, an extracting chamber, means in said extracting chamber to extract the juice from the fruits or vegetables, a liquid seal comprising, a container means for a pool of liquid, two water containing sections of the container, one communicating with the chamber and the other a feed section, means creating a flow of liquid to urge the fruits or vegetables from the feed section to the other section, and a rotating element with pockets therein adapted to receive the fruits or vegetables and deliver them to the extracting chamber.

6. In an apparatus for extracting juice from vegetables and fruits, an extracting chamber filled with an inert gas, means in said extracting chamber to extract the juice from the fruits or vegetables, a substantially U-shaped liquid seal communicating with the extraction chamber, means creating a flow of liquid in the seal to carry the fruits or vegetables through the seal, and a rotating element with pockets therein adapted to receive the fruits or vegetables and deliver them to the extracting chamber.

7. In an apparatus for extracting juice from vegetables and fruits, an extracting chamber having a non-oxidizing atmosphere, means in said extracting chamber to extract the juice from the fruits or vegetables, a liquid input seal communicating with the chamber, a baffle element in the seal, means to create a current of liquid to carry the fruits or vegetables under the baffle, a rotating element with pockets therein adapted to receive the fruits or vegetables and deliver them to the extracting chamber, and a liquid output seal leading from the extraction chamber through which waste is passed.

8. In an apparatus for extracting juice from vegetables and fruits, an extracting chamber having a non-oxidizing atmosphere, means in said extracting chamber to extract the juice from the fruits or vegetables, a liquid input seal communicating with the chamber, a baffle element in the seal, means to create a current of liquid to carry the fruits or vegetables under the baffle, a liquid output seal leading from the extraction chamber through which waste is passed, and an overflow pipe for conducting liquid from the liquid input seal to cause a flow of water to move the waste from the output seal.

9. In an apparatus for extracting juice from vegetables and fruits, an extracting chamber having a non-oxidizing atmosphere, means in said extracting chamber to extract the juice from the fruits or vegetables, a liquid input seal communicating with the chamber, a baffle element in the seal, means to create a current of liquid to carry the fruits or vegetables from the seal and deliver them to the extraction chamber, a liquid output seal leading from the extraction chamber through which waste is passed, and an overflow pipe for conducting liquid from the liquid input seal to cause a flow of water to move the waste from the output seal.

10. In an apparatus for extracting juice from vegetables and fruits, an extracting chamber having a non-oxidizing atmosphere, means in said extracting chamber to extract the juice from the fruits or vegetables, a liquid input seal communicating with the chamber, a baffle element in the seal, means to create a current of liquid to carry the fruits or vegetables under the baffle, a rotating element with pockets therein adapted to receive the fruits or vegetables and deliver them to the extracting chamber, a liquid output seal leading from the extraction chamber through which waste is passed, and an overflow pipe for conducting liquid from the liquid input seal to cause a flow of water to move the waste from the output seal.

11. In an apparatus for extracting juice from vegetables and fruits, an extracting chamber filled with an inert gas, means in said extracting chamber to extract the juice from the fruits or vegetables, a substantially U-shaped liquid seal communicating with the extraction chamber, means creating a flow of liquid in the seal to carry the fruits or vegetables through the seal, elevating means to raise the fruits or vegetables from the seal and deliver them to the extraction chamber, and a chute over which the fruits or vegetables pass from the elevating means to the extraction chamber, said chute having drainage means therein.

12. In an apparatus for extracting juice from vegetables and fruits, an extracting chamber having a non-oxidizing atmosphere, means in said extracting chamber to extract the juice from the fruits or vegetables, a liquid input seal communicating with the chamber, a baffle element in the seal, means to create a current of liquid to carry the fruits or vegetables under the baffle, elevating means to raise the fruit or vegetables from the seal and deliver them to the extraction chamber, a liquid output seal leading from the extraction chamber through which waste is passed, and a chute over which the fruit or vegetables pass from the elevating means to the extraction chamber, said chute having drainage means therein.

13. In an apparatus for extracting juice from vegetables and fruits, a liquid seal comprising; a container means for a pool of liquid provided with two intercommunicating sections, one of said sections being a feed section, means partially separating said sections disposed to allow vegetables and fruits to move from said feed section into the other section, said means preventing the return of the vegetables and fruits to the feed section; an extracting chamber, the other of said sections of the container means communicating with said extracting chamber; means interposed between said extracting chamber and said communicating chamber to feed said vegetables and fruits into said extracting chamber; means in said extracting chamber to extract the juice from the fruit or vegetables; and means creating a flow of liquid toward said extracting chamber.

14. In an apparatus for extracting juices from vegetables and fruits, a liquid seal comprising; a container means for a pool of liquid provided with two intercommunicating sections, one of said sections being a feed section, baffle means partially separating said sections disposed to allow vegetables and fruits to move from said feed section into the other section, said baffle means preventing the return of the vegetables and fruits to the feed section; an extracting chamber, the other of said sections of the container means communicating with said extracting chamber; rotating means provided with pockets adapted to receive the fruits or vegetables for delivery to said extracting chamber, said rotating means disposed between said extracting chamber and said section of the container means communicating therewith; means in said extracting chamber to extract the juice from the fruits or vegetables; and means creating a flow of liquid toward said extracting chamber.

15. An apparatus for extracting juices from vegetables, fruits, and the like, comprising; a liquid seal formed from a container having a liquid therein, an extracting chamber communicating with said liquid seal and adapted to hold inert gas, means creating the flow of liquid in the liquid seal toward said extracting chamber, means to feed said vegetables, fruits, and the like from the liquid seal to the extracting chamber, and extracting means within said extracting chamber to extract juice from the vegetables, fruits, and the like.

RONALD B. McKINNIS.